W. M. LEYDE.

THRASHING-MACHINE.

No. 7,731. Reissued June 12, 1877.

Witnesses:
W. C. Guy
Geo. H. Evans.

Inventor:
Wm. M. Leyde
per attys:
A. H. Evans & Co.

N. PETERS, PHOTO-LITHOGRAPHER, WASHINGTON, D. C.

BEST AVAILABLE COPY

UNITED STATES PATENT OFFICE.

WILLIAM M. LEYDE, OF NEWPORT, MINNESOTA.

IMPROVEMENT IN THRASHING-MACHINES.

Specification forming part of Letters Patent No. 150,694, dated May 12, 1874; reissue No. 7,731, dated June 12, 1877; application filed April 19, 1877.

*To all whom it may concern:*

Be it known that I, WILLIAM M. LEYDE, of Newport, Minnesota, have invented certain new and useful Improvements in Grain-Separators; and I hereby declare the following to be a full, clear, and exact description of the same, reference being had to the accompanying drawings, making a part of this specification, in which—

Figure 1:
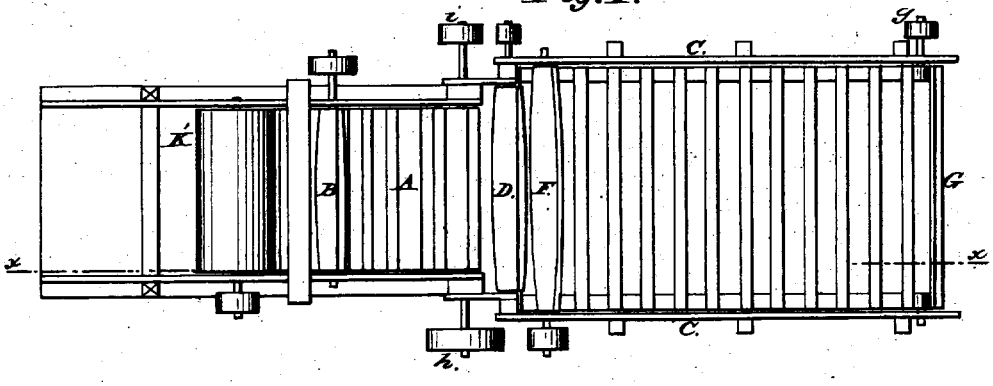
Figure 2:
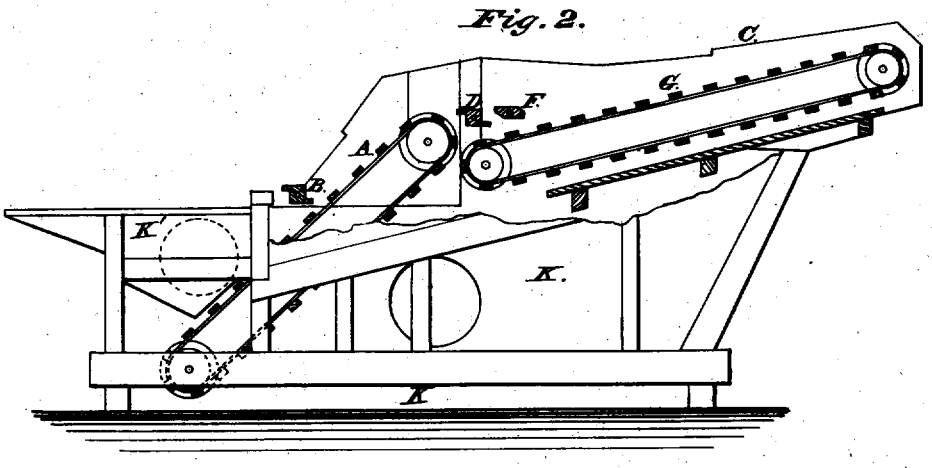
Figure 3:
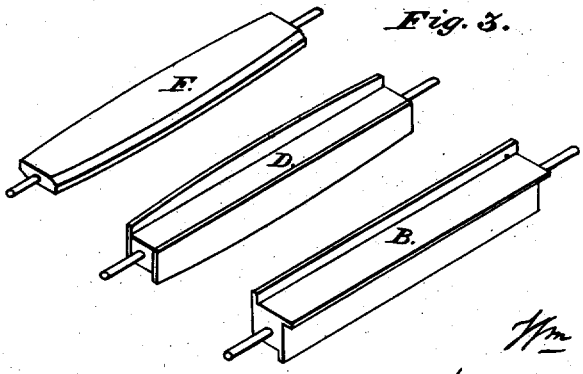

Figure 1 represents a plan view; Fig. 2, a longitudinal section taken at *x x*, Fig. 1; Fig. 3, detached views of the pickers and beaters.

My invention relates to improvements in grain-separators; and consists in the combination and arrangement of certain devices for the more thorough and rapid separation of the grain from the straw, as hereinafter more fully described.

In the drawings, K represents the main body of the machine, and K′ the front end or portion thereof, where the thrashing-cylinder is placed. A is the grain-carrier, and G the straw-carrier. The grain-carrier A extends from near the front and bottom of the machine, just beneath the thrashing-cylinder, upward and rearward. The straw-carrier consists of a broad trough, C, which projects some distance over each side of the main body K of the machine, extending upward and rearward from the end of the grain-carrier.

The broadening of the upper portion of the machine along that portion that contains the straw-carrier or secondary carrier is of great importance. I am aware that machines have been made wherein the secondary carrier has been given greater breadth than the primary carrier; but as neither have been made to extend beyond or even over the sides of the main body of the machine, it has been accomplished by a considerable narrowing of the primary carrier, and a consequent decrease in the receiving-capacity of the separator.

By my invention, that portion only of the machine is enlarged which encases the secondary carrier, and the main body of the machine is not altered in the least. The machinery, the truck, and the relation of the bed to the truck are none of them altered in the least, while the capacity of the machine is very greatly increased, since the primary carrier can occupy the entire breadth of the main body of the machine, and the enlargement of the secondary carrier beyond the sides of the main body of the machine, and can readily be attached as an alteration to the machines that are now in use without altering other parts.

B represents a picker or beater, placed close to the rear of the thrashing-cylinder and placed over the grain-carrier A, at a position on the same so as to assist and relieve the straw from the cylinder, and prevent choking and winding of the same. This picker or beater consists of a cylinder provided with four projecting flanges made of wood or iron, which assist the grain and straw up the carrier, at the same time producing a sort of beating action against the straw to shake out loose grain.

D is a picker, placed over the lower end of the straw-carrier G just at the end of the grain-carrier A, in a position to receive the straw from the grain-carrier. This picker D consists of a cylinder, provided with two projecting flanges, *d*, the outer edges of which flanges are curved, as shown in Fig. 3, so as to present a convex outline. The beater F is a flat board pivoted at the ends, and having both edges beveled and curved, so as to present a convex outline, as shown. These pickers B D and beater F receive proper rotary motion through the medium of the bands and pulleys *g h i*, &c., which also actuate the grain and straw carriers A G.

The object of making the edges of the beater F and the flanges *d* of the picker D curved or convex, as shown, is for the purpose of producing a beating or agitating action against the straw, and at the same time forcing it from the center of the trough toward the outside, thus evenly and thinly distributing it over the carrier, and thereby allowing the grain to escape more readily through it.

By the arrangement herein described—using a short grain-carrier and a very broad straw-carrier, and providing them with the pickers and beaters, all arranged and constructed substantially as shown—the grain is thoroughly and rapidly separated from the straw.

Having thus described my invention, what I claim as new, and desire to secure by Letters Patent, is—

1. In combination with the primary carrier

A and secondary carrier G, the picker D, provided with the convex-edged blades or flanges *d*, substantially as and for the purpose shown.

2. In combination with the primary carrier A, the secondary carrier G, the sides of which project over the main body of the machine, substantially as and for the purpose shown.

3. The combination of the primary carrier A, picker D, and beater or agitator F, each provided with convex-edged blades, with secondary carrier G made of a width greater than the primary carrier A, substantially as described.

4. The combination of the secondary carrier G made of a width greater than the primary carrier A, of the beater or agitator F, picker D, primary carrier A, and picker B, the several parts constructed and arranged to operate in the manner substantially as and for the purpose set forth.

WILLIAM M. LEYDE.

Witnesses:
WILLIAM READY,
L. W. VANDERHOOF.